Sept. 2, 1947.  M. N. BOSKOVICH  2,426,591
MUCKING MACHINE
Filed Sept. 15, 1945  2 Sheets-Sheet 1

INVENTOR.
Milan N. Boskovich
BY R. M. Thomas
Attorney.

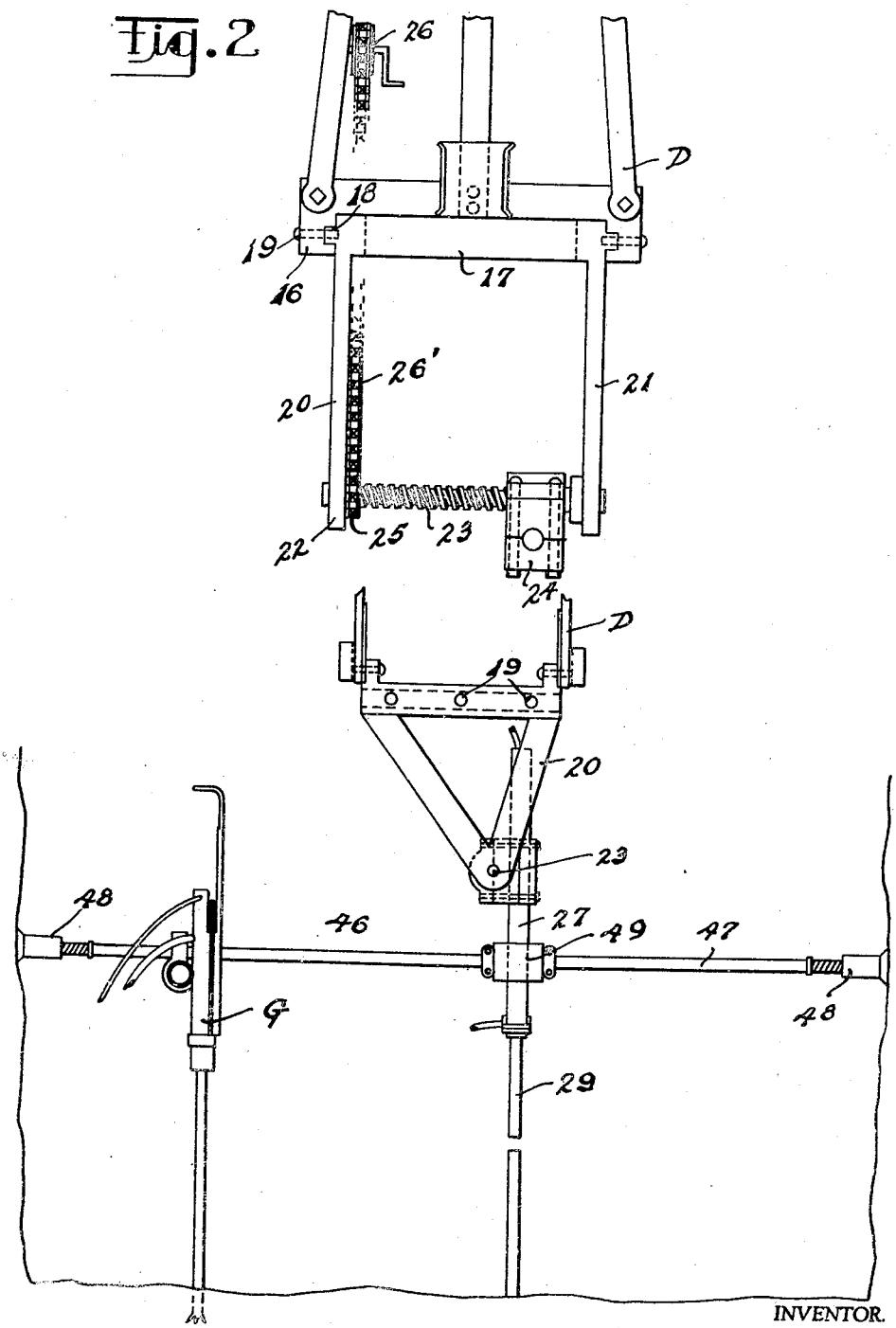

Patented Sept. 2, 1947

2,426,591

UNITED STATES PATENT OFFICE 2,426,591

MUCKING MACHINE

Milan N. Boskovich, Midvale, Utah, assignor of forty-nine one hundredths to Arthur O. Hall Application September 15, 1945, Serial No. 616,571

3 Claims. (Cl. 214—133)

My invention relates to mine shaft mucking devices and has for its object to provide a new and highly efficient combination of mine shaft mucking shovel and drilling support for compressor drills.

A further object is to provide a combination mine shaft mucking machine and self-operated mine cage, in which the operator may at will elevate or lower the cage from which the mucking device is supported.

A still further object is to provide a mine mucking machine for drilling mine shafts which device is suspended below the mine cage and is supported by the cage, the cage being provided with extra length guides to permit its being lowered below the shaft rails.

A still further object is to provide a mine mucking machine device which will be operable by one man doing the work of many, thus saving much time and labor.

These and other objects I accomplish with the device illustrated in the accompanying drawings in which similar numerals and letters of reference indicate like parts throughout the several views and as described in the specification forming a part of this application and pointed out in the appended claims.

In the drawings

Figure 2 is a side elevation of the lower part of the cage and showing the support for the mucking device suspended below the cage base.

Figure 3 is a view of the lower portion of the cage showing the use of the device as a support for drills.

Figure 1:
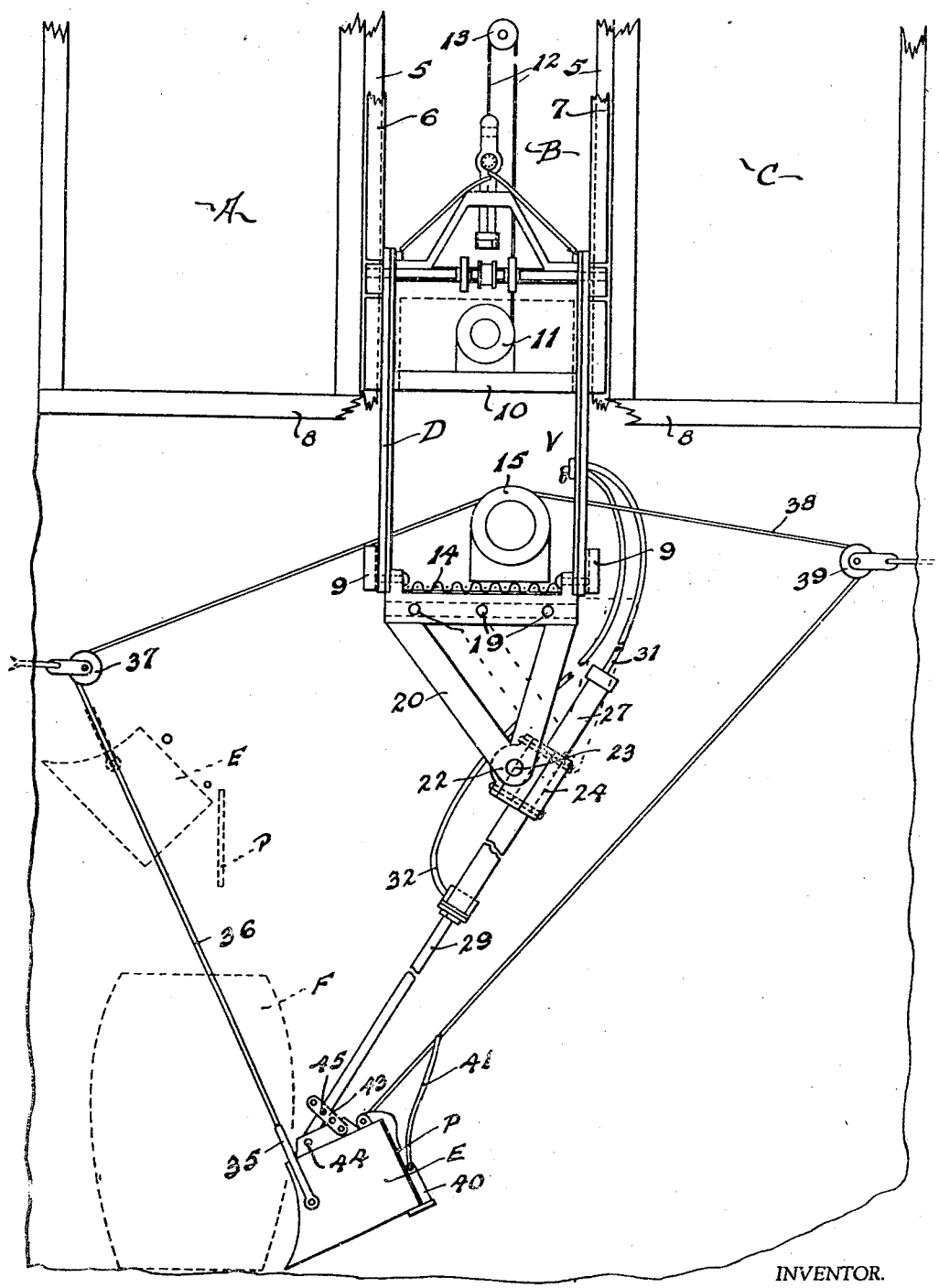
Figure 1 is a side elevation of a mine shaft, showing the cage lowered for using the mucking device.

In the drawings the mine shaft is shown as a three-compartment shaft, the compartments being shown as A, B, and C. The vertical guides for the mine cage D are shown as 5, and the mine cage is provided with extended shoes 6 and 7 at the top to permit dropping the cage down below the level of the lowest timbers 8 so that the mucking machine may be operated with full clearance and with full view to the operator of all of the area being mucked. The lower end of the cage is provided with short guide shoes 9 adapted to engage the guide rails when the cage is being elevated or lowered in the shaft. This cage is provided with an operator's platform 10 on which a hoist 11 is mounted, the hoist 11 being utilized to raise or lower the cage and mucker in the shaft without the need of another operator on the surface of the mine when such is necessary. The cable 12 is attached to the top of the cage and is carried up the shaft around a sheave 13 above the surface of the shaft and then down and attached to the lifting hoist 11. The floor of the cage is either solid or may be provided with a screen floor 14 to enable the operator to clearly see all of the floor of the mine shaft while he is operating the mucker. A double drum hoist 15 is mounted on the floor of the cage and a cable is attached to and operated by each drum of the hoist 15. The base of the cage D is provided with depending grooved guide members 16 along each edge thereof which carry the mucker supporting carriage 17. This carriage 17 is provided with outwardly extended rails 18 adapted to fit in the grooves 16 and to be held in place by removable locking pins 19. There are several holes in the guide member 16 and in the rails 18 to permit forward or backward shifting of the carriage when desired to extend the support position of the mucker forward or backward as desired by the operator to enable him to cover more area in mucking.

Depending from the longitudinal edges of the carriage 17 there are triangular-shaped support brackets 20 and 21 with bearings 22 in the apex of each bracket. These bearings support a horizontal support shaft 23 which may be threaded as shown in the drawings or made as a solid shaft as desired. On this shaft a shiftable bearing block and clamp 24 is carried. This block is internally threaded when the shaft is threaded and the block and clamp is adapted to be moved along the shaft by rotation thereof, thus providing lateral movement of the mucker when desired, broadening the scope of area of mucking. A sprocket 25 is mounted on the shaft and a sprocket 26 is mounted in the cage D. A sprocket chain 26' enables the operator to rotate the threaded shaft 23 to move the mucker support bearing block and clamp 24 by rotating the handle on the sprocket 26. Through the bearing block and clamp 24 there is a bore in which an air cylinder 27 is carried. This air cylinder carries a piston therein on the top end of a piston rod 29 extended out through a packing 30 on the lower end of the cylinder 27.

Air supply hoses 31 and 32 are connected to the top and bottom ends of the cylinder respectively for operating the piston and rod longitudinally in the cylinder. A hand control valve V is provided on the cage to control the flow of air through the hoses 31 and 32 to the cylinder for raising and lowering the shovel bucket E which is attached to the lower end of the piston rod 29. Thus the bucket or scoop E may be elevated or lowered at the will of the operator for use thereof.

The bucket has a bail 35 attached thereto and a cable 36 is attached to the bail and carried up through a sheave wheel 37 which is pinned to the side wall of the mine shaft slightly below the level of the hoist 15. The other end of the cable 36 is attached to one drum of the hoist 15 and is used to draw the bucket along the floor of the shaft for loading the bucket with muck. Another cable 38 is attached to the other drum of the hoist and is passed through a sheave 39 pinned to the opposite wall to that of the sheave 37 and the end of this cable 38 is attached to the rear end of the bucket for drawing it back between each forward stroke. Thus the bucket may be filled upon each forward stroke and made ready for another filling upon each backward stroke. The bottom of the bucket is provided with a pivoted closure plate P held closed by a spring catch 40 and operated by a rope 41 which is controlled by the operator. The bucket is filled and then elevated above the hoist bucket shown in dotted lines at F and the bottom tripped open dropping the muck into the hoist bucket. When this bucket is filled it is elevated up the shaft compartment B from above ground for dumping.

The lower end of the piston rod is attached either pivotally by the pin 44 or clamped rigidly thereto by brackets 43 and pins 45. When the muck has been removed and it is desired to drill for blasting the drill G is used as shown in Figure 3. This is done by setting the cylinder and piston rod vertically and then attaching a clamp 49 thereto. This clamp receives the ends of horizontal drill support rods 46 and 47, each of which is provided with the usual screw jack 48 at the ends thereof for locking the rods in rigid horizontal drilling position. The drill may then be used in the usual manner.

Having thus described my invention I claim:

1. A mine mucker comprising a mine cage, adapted to be operated in a mine shaft; means to permit lowering the cage below the lower end of the rails; a depending pair of brackets mounted under said cage; an air cylinder pivotally mounted between said brackets said cylinder being adapted to raise and lower a shovel bucket, through the movement of a piston and rod operating in the cylinder; a piston operable in said cylinder with a piston rod extending from the lower end of said cylinder; a bucket mounted on the extreme end of said piston; cable means to draw the bucket forward and backward in said shaft to pick up and dump the muck from the bottom of the shaft.

2. A device as set out in claim 1 including means to elevate and lower the cage independently from within the cage.

3. A mine mucker comprising a mine cage; depending brackets on the underside of said cage; an air cylinder assembly pivotally mounted between said brackets, said cylinder having the piston rod of the assembly extending downwardly into the shaft; a bucket attached to the end of the piston rod; means to draw the bucket forward in the bottom of the shaft for picking up the muck therefrom; and means to adjust the position of the brackets under the cage to lengthen the stroke of the cylinder assembly.

MILAN N. BOSKOVICH.

REFERENCES CITED

The following references are of record in the file of this patent:

UNITED STATES PATENTS

| Number | Name | Date |
| --- | --- | --- |
| 1,317,366 | Greenough et al. | Sept. 30, 1919 |
| 388,910 | Osgood | Sept. 4, 1888 |
| 2,358,543 | Tofflemire | Sept. 19, 1944 |
| 2,147,663 | Miller | Feb. 21, 1939 |
| 436,928 | Thew | Sept. 23, 1890 |

FOREIGN PATENTS

| Number | Country | Date |
| --- | --- | --- |
| 577,621 | Germany | June 2, 1933 |
| 691,070 | Germany | May 16, 1940 |
| 18,250 | Great Britain | 1910 |